(12) United States Patent
Anderson et al.

(10) Patent No.: US 7,996,370 B2
(45) Date of Patent: Aug. 9, 2011

(54) SYSTEM RESTORATION APPARATUS AND METHOD FOR MANAGEMENT OF DEPENDENCIES, ORDERING SENSITIVITIES, AND DATABASE INDEX REBUILDS

(75) Inventors: Mark John Anderson, Oronoco, MN (US); Donald R. Halley, Rochester, MN (US); Paul Douglas Koeller, Rochester, MN (US); Ritchie Lee Nyland, Rochester, MN (US); Kathryn Rose Steinbrink, Chatfield, MN (US)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 11/956,028

(22) Filed: Dec. 13, 2007

(65) Prior Publication Data
US 2009/0157765 A1    Jun. 18, 2009

(51) Int. Cl.
*G06F 17/30* (2006.01)
(52) U.S. Cl. ............. 707/674; 707/781; 714/15; 714/16
(58) Field of Classification Search .................. None
See application file for complete search history.

(56) References Cited

U.S. PATENT DOCUMENTS

| | | | | |
|---|---|---|---|---|
| 6,151,607 | A * | 11/2000 | Lomet | 1/1 |
| 6,192,376 | B1 * | 2/2001 | Kincaid et al. | 707/696 |
| 6,470,359 | B1 * | 10/2002 | Lyle | 1/1 |
| 6,895,529 | B2 * | 5/2005 | Egolf et al. | 714/15 |
| 7,076,508 | B2 * | 7/2006 | Bourbonnais et al. | 1/1 |
| 7,277,900 | B1 * | 10/2007 | Ganesh et al. | 707/682 |
| 7,363,633 | B1 * | 4/2008 | Goldick et al. | 719/328 |
| 7,555,502 | B2 * | 6/2009 | Chandrasekaran | 1/1 |
| 7,558,928 | B1 * | 7/2009 | DeVos | 711/162 |
| 7,617,250 | B2 * | 11/2009 | Xu et al. | 1/1 |
| 7,716,261 | B2 * | 5/2010 | Black | 707/827 |
| 7,822,758 | B1 * | 10/2010 | Prakash et al. | 707/758 |
| 2003/0140070 | A1 * | 7/2003 | Kaczmarski et al. | 707/204 |
| 2003/0217027 | A1 * | 11/2003 | Farber et al. | 707/1 |
| 2006/0129614 | A1 * | 6/2006 | Kim et al. | 707/202 |

* cited by examiner

*Primary Examiner* — Tim T. Vo
*Assistant Examiner* — Michelle Owyang
(74) *Attorney, Agent, or Firm* — Wood, Herron & Evans, LLP (57) ABSTRACT

A method, apparatus, and program product restore database data having dependencies or ordering sensitivities, or that incorporates a database index. Unresolved dependencies are identified in response to an attempt to restore data in a computer. The data restoration is deferred and the data is cached when it has an unresolved dependency. After the dependency is resolved, the data restoration is completed. The unresolved dependency may be based-on data that must be restored or created prior to completing restoration. Deferred data is cached in memory and tracked in a deferred operation table. Data that is deferred may be accessed so long as operations that access the underlying based-on data are denied.

18 Claims, 5 Drawing Sheets

SYSTEM RESTORATION APPARATUS AND METHOD FOR MANAGEMENT OF DEPENDENCIES, ORDERING SENSITIVITIES, AND DATABASE INDEX REBUILDS

FIELD OF THE INVENTION

The present invention relates to computing systems, and more particularly to restoration of data having a dependency.

BACKGROUND OF THE INVENTION

Databases and information systems comprise a large part of modern infrastructure. A database is a structured collection of records or data that is stored in a computer to answer a query. The query may come from a user of the computer, another computer, or a program. The information in the database can be utilized to make a decision. The database can be configured to store any type of information.

In a personal or business environment data is a valuable and important commodity. As such, it is important to protect data from being lost or corrupted. In particular, it is important to quickly recover data from a database into a working state after the failure of a computer. In a typical environment, information in a database is copied and stored on a persistent backup media. The database, in turn, can be recovered from the backup media after a failure.

While in some environments a database can be recovered while a computer is offline, in many high performance and high availability applications, database recovery is required to occur while a computer is online and in an operational state. Otherwise, the database recovery process could render the computer unavailable an unacceptable amount of time. Recovering a database while a computer is operational, however, can introduce significant complexities and difficulties due to the need to coordinate the recovery of database information with ongoing attempts to access information in the database.

Recovering a database may involve restoring logical objects, based-on objects, ordering sensitivities (i.e. some databases, objects, files, libraries, and indices may be required to be restored before others), and rebuild indices. Typically, an object, library, or index cannot be accessed by the user before it has been restored. Recovering a database involves the need for an operator or administrator to help recover the database, the need to re-spin backup media such as a tape drive one or more times, and the need to rebuild database indexes.

In a typical database, several dependency and ordering sensitivities may exist. There may be multiple indexes, multiple libraries, and multiple objects with several dependencies in other databases, objects, libraries, or indexes. Consequently, when restoring multiple libraries, the user may have difficulties managing logical files or Structured Query Language ("SQL") views that reside in a different library than their own based-on or physical file. If a library with a logical file is restored before a library with an underlying physical file (or based-on file), the logical file will not restore. A database recovery process normally requires the user to monitor a joblog for restoration failures. Alternately, a database recovery process will query another file, called an "outfile," to detect such failures. A notification will go to the outfile each time there is a dependency that has not been resolved. To restore a single logical file successfully, it may be necessary to re-spin tape media (i.e., rewind the tape and perform another restore using the same media) several times to restore based-on files first. This problem is compounded when there are many logical files with other based-on logical files.

A SQL Materialized Query Table ("MQT"), also called a summary table, has the same problem with restoration as the SQL views and logical files described above. MQTs are physical files, but like SQL views, they may have dependencies on one or more based-on files. Therefore, an MQT cannot be restored if a based-on file is missing.

Database indexes have the same problems as other logical files. However, restoring a database index can be a Catch-22. An index cannot be restored if an underlying based-on file is missing. Conversely, if a based-on file is restored first, the index must be rebuilt. Rebuilding database indexes can be extremely time consuming, oftentimes adding hours to the time required to recover a database. To avoid rebuilding an index it is necessary that the index be restored along with the based-on files. When restoring networks of files that span libraries the user has no control over this problem and may only avoid the problem entirely by creating indexes in the same library as the based-on files. This is a very restrictive design consideration and may not be an acceptable circumvention to certain database users.

Consequently, there is a need to improve restoration of a database that has data with one or more dependencies.

SUMMARY OF THE INVENTION

Embodiments of the invention provide for data restoration in a computer that monitors the data for unresolved dependencies during a data restoration, then caches, tracks, and defers restoration of the data with the dependency until the dependency has been resolved.

In accordance with embodiments of the invention, the data restoration identifies at least one unresolved dependency that must be resolved for an entity to be restored in response to an attempt to restore the entity in a computer. The restoration of the entity to be restored is deferred and data associated with the entity is cached in response to identifying the unresolved dependency. After the dependency is resolved, the restoration of the entity is completed. The unresolved dependency can be a based-on entity that must be restored or created prior to restoration of the entity to be restored.

In one embodiment of the invention, the entity to be restored is restored after the unresolved dependency of the entity has been restored. In another embodiment of the invention, a user explicitly requests that the entity be restored because the unresolved dependency has been restored or created.

In one embodiment of the invention, the entity to be restored and information about the entity to be restored are cached in a deferred operation table. When the restoration of the entity to be restored is complete the information on the entity to be restored is deleted from the deferred operation table. When all entities to be restored have been restored, the deferred operation table may be deleted.

In one embodiment of the invention, the entity to be restored is restored with an indication that it is deferred. The restored entity can be accessed, but access is limited to operations on the restored entity that do not require access to any of its dependencies. These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION

The invention provides a method, apparatus, and program product for restoring database data in a computer. In particular, the invention provides for tracking, caching, and deferring the restoration of data that cannot be restored due to an unresolved dependency. The data to be restored may be an object, library, table, logical file, physical file, metadata, index of the database, or may be a database itself. The data to be restored may furthermore be a subset of the data listed above. For simplicity, the term "object" will generically be used to refer to all of the aforementioned types of data that are capable of being restored, with the understanding being that the term should not be interpreted to refer merely to an "object" within the context of object oriented programming.

The object to be restored may simply be copied from a backup media device onto a target computer. However, when the object is dependent on another underlying object there is said to be a "dependency" and restoration is more complex. A dependency occurs when an object points to, or incorporates, another object. When the object is dependent on another underlying object that has not been restored there is said to be an "unresolved dependency." An object with an unresolved dependency typically cannot be fully restored until the dependency is resolved, and as such, the object with the unresolved dependency may be said to be missing one or more "based-on object." The based-on object may satisfy a dependency, and therefore must be restored before the object with the unresolved dependency may be restored. Generically, the based-on object may also be an object for which another object is dependent. Likewise, a based-on object itself might be dependent upon another object. The invention provides for gathering information to track and deferring objects with unresolved dependencies during a restoration. When the object to be restored is a logical file with an unresolved dependency, the object to be restored is cached in a memory or mass storage device for later restoration. When the object to be restored is a physical file with an unresolved dependency, information associated with the object, such as a portion of the object or information describing the object is restored, while the rest is cached in a memory or mass storage device for later restoration. In this way, when the object to be restored is a physical file with an unresolved dependency it may be accessed, but access is limited to operations on the restored entity that do not require access to the any of the dependencies. Likewise, a based-on object itself might be dependent upon another object.

Figure 1:
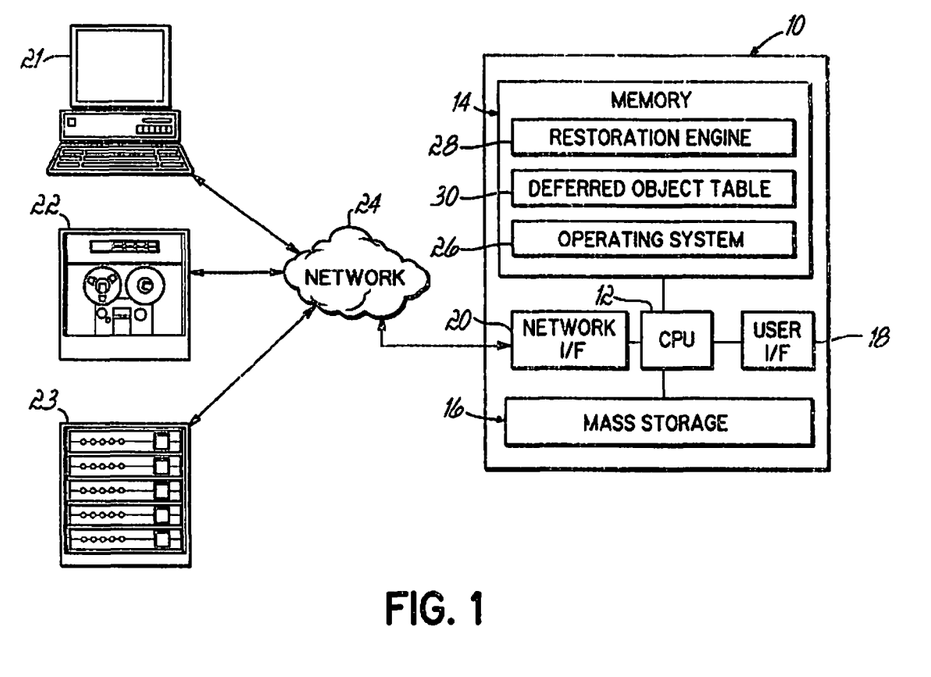
FIG. 1 is an exemplary hardware and software environment for a computing device suitable for implementing system restoration consistent with the invention.

Turning to the drawings, wherein like numbers denote like parts throughout the several views, FIG. 1 illustrates a hardware and software environment for an apparatus 10 suitable for implementing a method for database restoration management of dependencies, ordering sensitivities, and database index rebuilds consistent with the invention. Apparatus 10, for purposes of this invention, may represent any type of computer, computer system, server, disk array, or programmable device such as multi-user computers, single-user computers, handheld devices, networked devices, mobile phones, gaming systems, etc. Apparatus 10 may be implemented using one or more networked computers, e.g., in a cluster or other distributed computing system. Apparatus 10 will be referred to as "computer" for brevity sake, although it should be appreciated that the term "apparatus" may also include other suitable programmable electronic devices consistent with the invention.

Computer 10 typically includes a central processing unit ("CPU") 12 including one or more microprocessors coupled to a memory 14 along with several different types of peripheral devices, e.g., a mass storage device 16, a user interface 18 (including, for example, user input devices and a display), and a network interface 20. The network interface 20 communicates with one or more computers 21, one or more network storage devices 22 (including, for example, a tape drive), or one or more other network devices 23 (including, for example, a server) over a network 24. Computer 21, network storage device 22, and networked device 23 will be referred to as "networked devices" for brevity sake.

Computer 10 is under the control of an operating system 26 and executes or otherwise relies upon various computer software applications, components, programs, files, objects, modules, data structures, etc., including, for example, a restoration engine ("engine") 28 and a deferred object table ("QADBRSDFR") 30 for use with the restoration process described herein. Moreover, various applications, components, programs, objects, modules, etc. may also execute on one or more processors in another networked device coupled to computer 10 via a network 24, e.g., in a distributed or client-server computing environment.

In general, the routines executed to implement the embodiments of the invention, whether implemented as part of an operating system or a specific application, component, algorithm, program, object, module or sequence of instructions, or even a subset thereof, will be referred to herein as "computer program code" or simply "program code." Program code typically comprises one or more instructions that are resident at various times in memory and storage devices in a computer, and that, when read and executed by at least one processor in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies regardless of the particular type of computer readable media used to actually carry out the invention. Examples of computer readable media include, but are not limited to, recordable type media such as volatile and non-volatile memory devices, floppy and other removable disks, hard disk drives, tape drives, optical disks (e.g., CD-ROM's, DVD's, HD-DVD's, Blu-Ray Discs), among others, and transmission type media such as digital and analog communications links.

In addition, various program code described hereinafter may be identified based upon the application or software component within which it is implemented in specific embodiments of the invention. However, it should be appreciated that any particular program nomenclature that follows is merely for convenience (such as referring to restoration engine 28 as "engine 28"), and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, Application Programming Interfaces [APIs], applications, applets, etc.), it should be appreciated that the invention is not limited to the specific organization and allocation of program functionality described herein.

Those skilled in the art will recognize that the environment illustrated in FIG. 1 is not intended to limit the present invention. Indeed, those skilled in the art will recognize that other alternative hardware and/or software environments may be used without departing from the scope of the invention.

Restoration Environment

In the environment illustrated in FIG. 1, a restoration process consistent with an embodiment of the invention is initiated by a user, an operator, or an administrator of computer 10. In one embodiment, the user types a command that is captured by user interface 18 and instructs computer 10 to restore data to a target device. The target device may be computer 10, another computer in communication with computer 10, or a networked device in communication with computer 10 through network 24. The data may be stored in memory 14, mass storage 16, or a networked device. The data to be restored may be an application, component, algorithm, program, physical file, logical file, file, object, entity, Structured Query Language ("SQL") view, SQL Materialized Query Table ("MQT"), database, index, SQL collection, library, table, journal, module or sequence of instructions, among other types of data.

In an alternate embodiment, mass storage 16 includes a backup media device (which may include a tape drive, for example). In this alternate restoration process consistent with the invention, the command from the user instructs computer to restore data from the backup media device to a target device. The target device may be computer 10, another computer in communication with computer 10, or a networked device.

In a further alternate embodiment, a restoration process consistent with the invention may be initiated from one of the networked devices. For example, a networked device may initiate a restoration process by instructing computer 10 to restore data to a target device. The target device may be computer 10, another computer in communication with computer 10, or a networked device. In this way, both the initiation of the restoration and the information restored may proceed across network 24.

Those skilled in the art will recognize that the restoration environments illustrated above and in FIG. 1 are not intended to limit the present invention. Those skilled in the art will recognize that a process or program, rather than a user, an operator, or an administrator may initiate a restoration process. Those skilled in the art will also recognize that "data," "file," "entity," and "object" may be used interchangeably without departing from the scope of the invention. Those skilled in the art will further recognize that "target machine" and "backup media device" may specify simply the location the data is to be restored and the location where the data is stored, respectively. Indeed, those skilled in the art will recognize that other alternative restoration environments may be used without departing from the scope of the invention.

Data Restoration

Engine 28 may be implemented using program code that provides a fast, simple, and virtual method for managing object dependencies when restoring objects whose dependency networks may span multiple libraries or SQL collections. Engine 28 is configured to eliminate the need for the user to manage special ordering, grouping, or processing of objects that are being restored from backup media. Engine 28 also often eliminates the need to re-access the backup media device when restoring data to pick up an object that did not restore on a first pass because one or more based-on objects did not exist. Engine 28 also minimizes or eliminates the need to rebuild database indexes. Engine 28 furthermore often eliminates the need for the user, operator, or administrator to monitor joblogs or query outfiles to detect an ordering-induced failure or understand a dependency network hierarchy.

Figure 2:
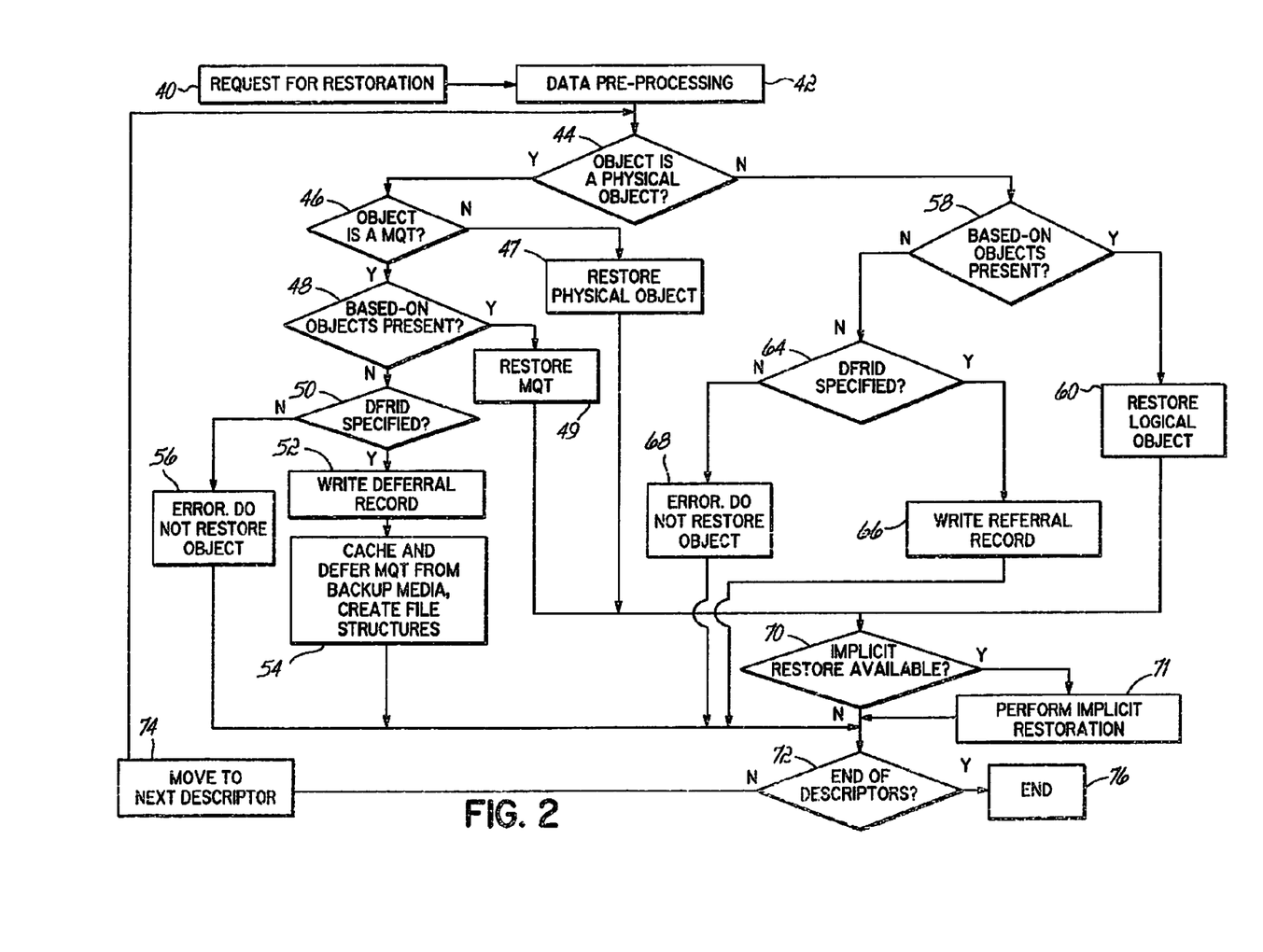
FIGS. 2-4 are flowcharts illustrating one exemplary implementation of a system restoration routine suitable for being performed by the computing device referenced in FIG. 1.

FIG. 2 is a flowchart illustrating a process engine 28 may undertake to cache, track, and defer (rather than fail) the restoration of database logical objects (which may include SQL views), physical objects (which may include MQTs), database indexes, and other data whose based-on objects are not available during a restoration process consistent with an embodiment of the invention.

At step 40, a request for restoration of data is received. The restoration request may include the name of one or more files, objects, libraries, databases, or the name of at least one set of data to be restored. The restoration request may also include the location of the data (such as the location or address of the backup media device), the location where the data is to be restored (such as the location or address of the target machine), and a defer identification ("DFRID") to assign to files that cannot be restored. The DFRID is an optional parameter specified in a restoration request that provides an association between a collective set of deferred data. Engine 28 pre-processes the data to be restored at step 42 by identifying the location of the data, the objects to be restored, the target machine to which the objects are to be restored, and loading the object descriptor of the first object to be restored.

At step 44, engine 28 determines whether the object is a physical object. When the object is a physical object engine 28 determines whether the physical object is an MQT at step 46. Engine 28 determines whether the physical object is an MQT by referencing a File Definition Template ("FDT") of the physical object. An FDT consistent with one embodiment of the invention contains information about the basic structure of objects and is used when creating, extracting, or performing operations against objects. The information in the FDT may include the object name, the library of the object, the classification of the object, size of the object, whether the object can be restored despite the non-existence of one or more deferred or absent based-on objects, pointers to based-on objects, names and libraries of based-on objects, and whether the object is deferred. When the physical object is not an MQT it is restored at step 47. At step 47, the physical object is loaded off the backup media device onto the target machine with the physical object's FDT, data, and indices. In this way, restoration of the physical object is complete.

Returning to step 46, if the physical object is an MQT, engine 28 determines at step 48 whether all based-on objects of the MQT are present. When all based-on objects of the MQT are present the MQT is restored at step 49. At step 49, the MQT is loaded off the backup media device and onto the target machine with the MQT FDT, a query access plan for the MQT is created, pointers to the based-on files are stored in the MQT FDT, and the MQT is added to all directories of its based-on files. In this way, restoration of the MQT is complete.

Returning to step 48, in the event that at least one based-on object of the MQT is absent, engine 28 determines whether a DFRID was specified in the restoration request at step 50. When an MQT is determined to have at least one based-on object absent and a DFRID has been specified with the restoration request, the specified DFRID is associated with the MQT with at least one absent based-on object and engine 28 writes a corresponding deferral record in QADBRSDFR 30 at step 52. QADBRSDFR 30 is populated with deferral records that contain information about deferred and cached objects. The information in a deferral record may include the DFRID of the deferred object, the deferred object name, the library of the deferred object, the classification of the deferred object (including whether the object is an MQT), the library name of at least one absent or deferred based-on object, the name of at least one absent or deferred based-on object, the actual data comprising an object, and/or other object information. Engine 28 is configured to obtain some of the information written to QADBRSDFR 30 from the FDT of the object.

At step 54, engine 28 creates the MQT file structure. The file structure of the MQT may include a reservation of the space required and the data space format of the MQT (such as number of columns and rows, but not the actual data in the MQT). Also at step 54, engine 28 loads the MQT's FDT and the data in the MQT onto the target machine and sets a flag on the target machine MQT's FDT indicating that the target machine MQT is deferred. In this way, a deferred MQT is a viewable and useable object, but functions performed on the deferred MQT that require access to its based-on files will fail. The deferred MQT may decrease the time required for the restoration process by restoring the data space for the deferred MQT from the backup media on the first pass.

Returning to step 50, when a request for restoration does not specify a DFRID and the physical object is an MQT with one or more based-on objects absent, engine 28 declares an error and does not restore the MQT at step 56. At step 56, engine 28 may also make an entry in a joblog or outfile to notify a user of the failure.

Referring back to step 44, when the object is not a physical object (and is thus a logical object), engine 28 proceeds to step 58. At step 58, engine 28 determines whether all based-on objects of the logical object are present. When all based-on objects of the logical object are present engine 28 will proceed to step 60. At step 60, the file structures of the logical object are created on the target machine. Also at step 60, the logical object is loaded onto the target machine with the logical object FDT, a query access plan for the logical object is created for SQL views, and pointers to the based-on files are stored in the logical object FDT. In this way, restoration of the logical object is complete. Only when all based-on objects of a logical object are present will the engine 28 create the logical object file structures and restore the logical object and logical object FDT.

Returning to step 58, engine 28 proceeds to step 64 when it determines that at least one based-on object is absent from the logical object. At step 64, engine 28 determines whether a DFRID was specified in the restoration request. When the logical object is determined to have at least one based-on object absent and a DFRID has been specified with the restoration request, that DFRID is associated with the logical object with at least one absent based-on object and engine 28 writes a corresponding deferral record in QADBRSDFR 30 at step 66. Also at step 66, the logical object's FDT is cached in the deferral record.

Returning to step 64, when a request for restoration does not specify a DFRID and the logical object has at least one based-on object absent, engine 28 declares an error and does not restore the logical object at step 68. Also at step 68, engine 28 may make an entry in a joblog or outfile to notify a user of the failure.

After engine 28 has completed step 47, 49, or 60 it determines whether an implicit restoration is available for a deferred MQT or cached, deferred logical object (collectively "cached object") at step 70. At step 71, engine 28 will implicitly restore a cached object when an object was restored in steps 47, 49, or 60, there was a DFRID specified for the restoration process, and a cached object with the same DFRID is dependent on a newly restored object. In this way, engine 28 may determine whether one or more cached objects depended on the newly restored object. In general, when an object is determined to be dependent upon a cached object, the object and cached object are typically assigned the same DFRID and the restoration of both is deferred. In this way, the DFRID provides an association between a collective set of cached objects. As such, in one embodiment of the invention there may be a group of "nested" cached objects assigned the same DFRID. For example, a cached object (O) may have an unresolved dependency in the form of a first cached based-on object (A). Likewise, the first cached based-on object (A) may in turn have an unresolved dependency in the form of a second cached based-on object (B). The cached object, first cached based-on object, and second cached based-on object will all have information cached in a deferral record in the QADBRSDFR 30 and assigned the same DFRID during a restoration process. The matching DFRIDs indicate a possible group dependency. To further illustrate, the first cached object may be restored only after its second cached based-on object has been restored (i.e., B must be restored before A), and the cached object may be restored only after the first cached based-on object has been restored (i.e., in summation, B must be restored before A, and A must be restored before O). This process may occur in an implicit restoration.

Returning back to step 70, when there is no implicit restoration at step 71, or after completing steps 54, 56, 66, or 68, engine 28 determines whether there are more object descriptors for the restoration at step 72. When there are more object descriptors, which may indicate that the restoration process is not complete, the engine advances the to the next object descriptor at step 74 and proceeds to restore the next object at step 44.

Returning back to step 72, when there are no more object descriptors, which may indicate that the restoration process has completed, the restoration process may terminate at step 76. After a restoration process terminates, cached objects that have not been implicitly restored remain in memory 14 or mass storage 16 and QADBRSDFR remains in memory 14. Cached objects may be restored by a subsequent restoration command that specifies the particular DFRID of the cached deferred objects stored in QADBRSDFR 30. In this way, one or more cached objects dependent on data that is not restored in a current restoration process may be restored at a subsequent time without having to re-access the backup media device.

Implicit Restoration

Referring back to step 70, if there is an implicit restoration available, engine 28 initiates an implicit restoration at step 71.

Figure 3:
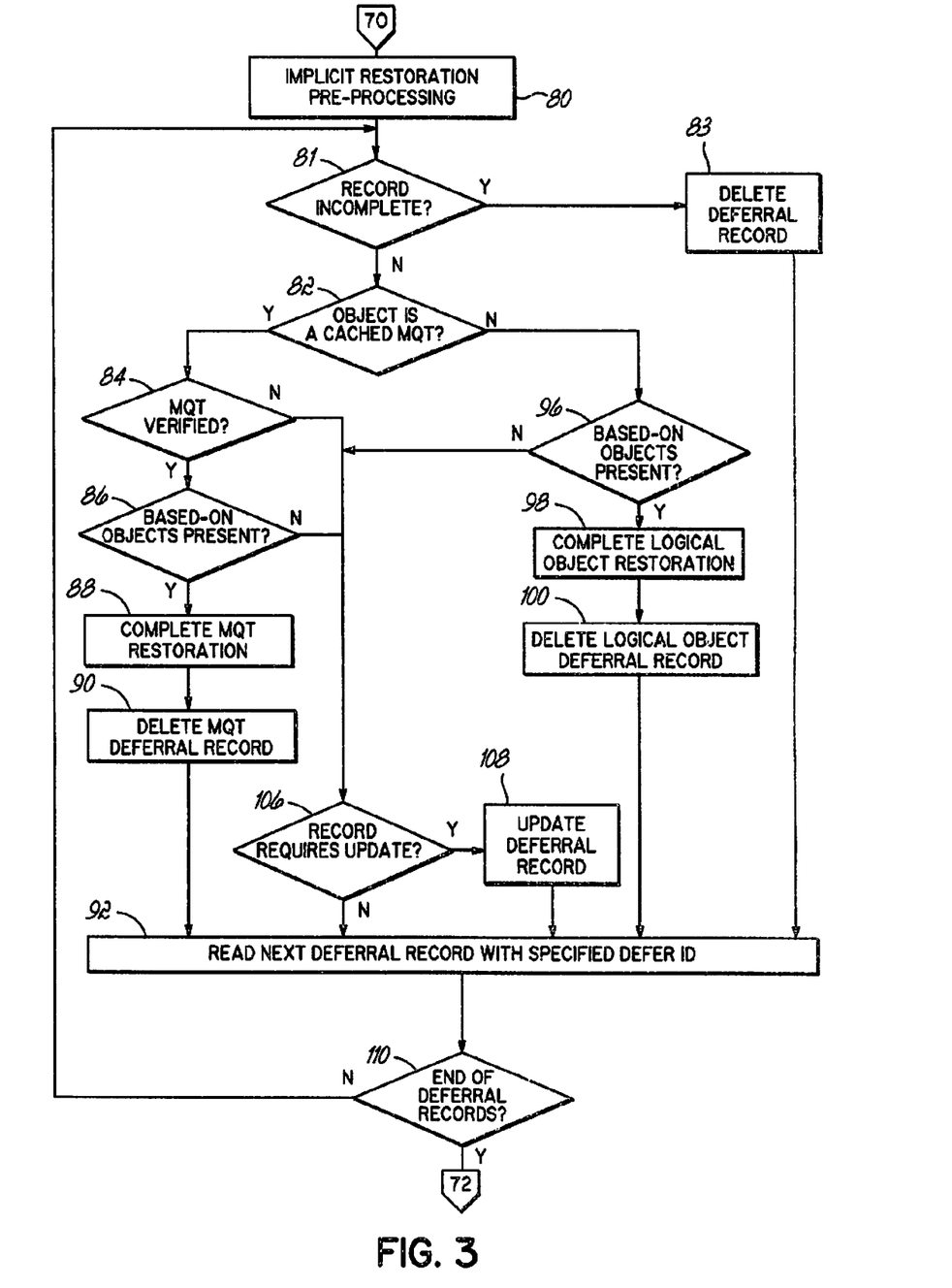

FIG. 3 is an illustration of an implicit restoration process engine 28 may undertake to implicitly restore cached objects consistent with an embodiment of the invention. Referring to FIG. 3, at step 80, engine 28 accesses QADBRSDFR 30 and finds the first deferral record that has a matching DFRID of the object restored at steps 47, 49, or 60 of FIG. 2. At step 81, engine 28 determines if the deferral record is incomplete. When the record is not incomplete, the engine will proceed to step 82 to determine whether the deferral record specifies a deferred MQT. Referring back to step 81, when the record is complete, engine 28 will delete the incomplete deferral record at step 83. An incomplete deferral record may specify a DFRID and the classification of the deferred object, but then fail to specify the name or dependencies of the deferred object. An incomplete deferral record may also specify a DFRID and the classification of the deferred object, but specify a deferred object that is invalid or does not exist. After the incomplete deferral record has been deleted, engine 28 reads the next deferral record with the specified DFRID at step 92.

Engine 28 determines from the deferral record whether the deferred object is a MQT at step 82. When the deferred object is a MQT, engine 28 resolves to the deferred MQT and verifies it at step 84. Engine 28 verifies the deferred MQT by referencing the deferred MQT's FDT to determine if the deferred MQT is a physical object, has the classification of MQT, and is in a deferred state.

When the deferred MQT is verified, engine 28 determines whether all based-on objects of the deferred MQT have been restored to the target machine at step 86. If all based-on objects of the deferred MQT are present, engine 28 will complete the deferred MQT's restoration at step 88 by resetting the flag in the deferred MQT's FDT to indicate the deferred MQT is no longer deferred, creating a query access plan for the MQT, storing pointers to the based-on objects of the MQT in the MQT's FDT, and adding the MQT to all directories of its based-on objects. At step 90, engine 28 deletes the record in QADBRSDFR 30 corresponding to the restored MQT. Engine 28 reads the next deferral record with the specified DFRID at step 92.

Referring back to step 82, when the cached object is not a deferred MQT, engine 28 determines the cached object is a cached logical object. At step 96, engine 28 determines whether all based-on objects of the cached logical object have been restored. When all based-on objects of the cached logical object have been restored, the file structures of the logical object are created on the target machine at step 98. Also at step 98, the cached logical object is loaded onto the target machine into the corresponding file structures, the cached logical object FDT is loaded onto the target machine, a query access plan for the newly restored SQL view is created, and pointers to the based-on objects are stored in the newly restored logical object FDT. At step 100 engine 28 deletes the deferral record in QADBRSDFR 30 corresponding to the recently deleted cached logical object. Engine 28 reads the next deferral record with the specified DFRID at step 92.

When the cached object cannot be verified at step 84, or at least one based-on object of the cached object is found to be absent as determined at step 86 or step 96, engine 28 determines if the deferral record requires an update at step 106. When the deferral record requires an update, the engine updates the deferral record in QADBRSDFR 30 at step 108. A deferral record update may be required if it is determined at step 84 that the physical object was not an MQT, or at step 86 or 96 that one or more based-on objects of the deferred object are still absent.

After completing steps 83, 90, 100, or 108, or determining that no record requires an update in step 106, engine 28 reads the next deferral record with the specified DFRID to determine if more recursion is required in the implicit restoration at step 92. At step 110, engine 28 determines whether there are more deferral records in the QADBRSDFR 30. More deferral records may indicate that the implicit restoration process is not complete and engine 28 determines if the deferral record is incomplete at step 81. A lack of deferral records may indicate that the implicit restoration process has completed, and the restoration process will continue to step 72 as shown in FIG. 2.

Explicit Restoration

Figure 4:
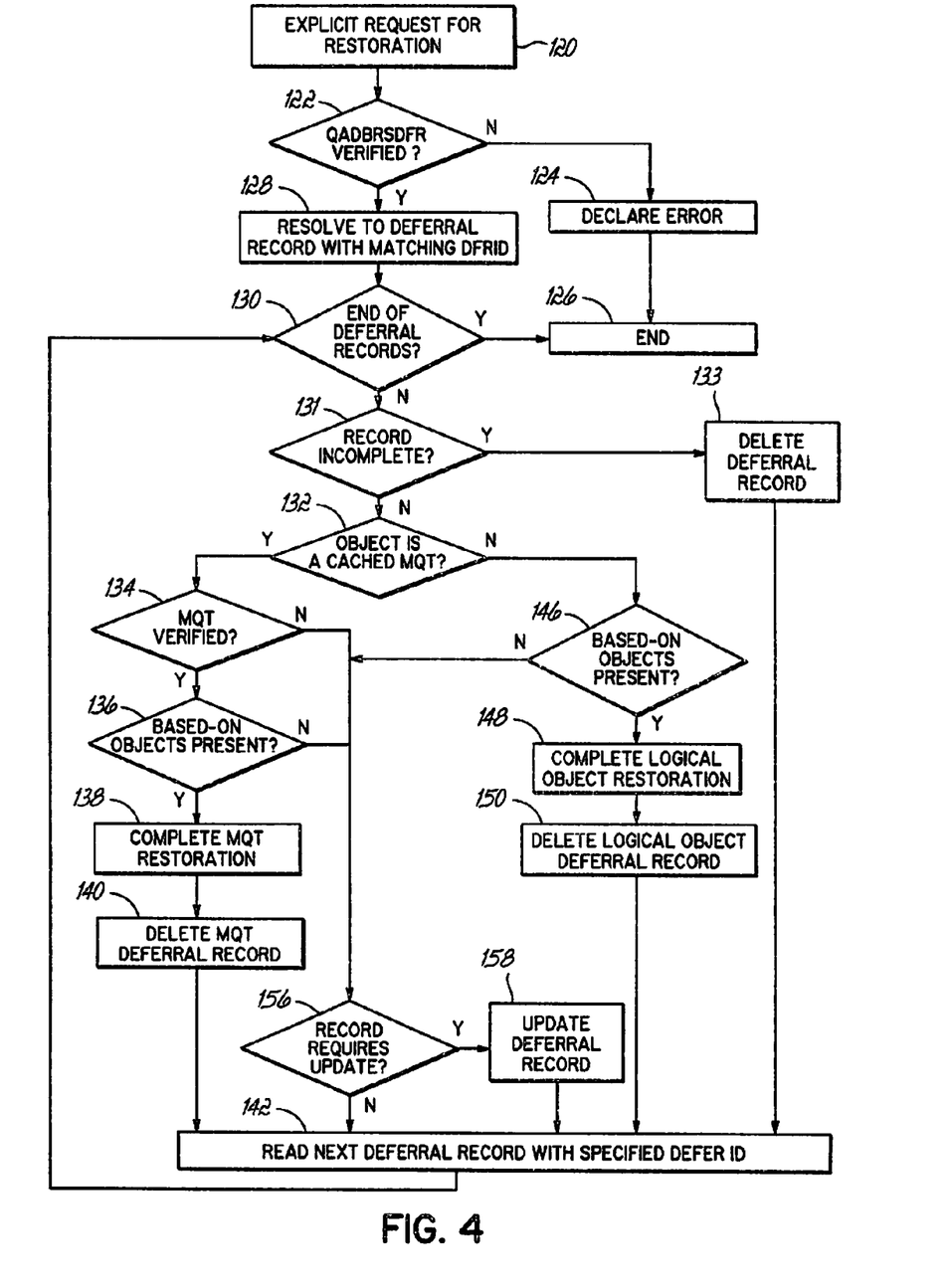

In one embodiment of the invention, after a restoration process consistent with an embodiment of the invention and illustrated in FIGS. 2 and 3, engine 28 may be configured to restore data that was not restored during the restoration or implicit restoration processes. FIG. 4 is a flowchart illustrating an explicit cached data restoration process ("explicit restoration") engine 28 may undertake to restore cached objects consistent with an embodiment of the invention. At step 120, a request for explicit restoration will be received by engine. The request for explicit restoration may be initiated by an operator, administrator, or user. The explicit restoration request will specify a DFRID corresponding to the DFRID of a cached object that had previously been cached, tracked, and deferred. At step 122, QADBRSDFR 30 is verified. To verify QADBRSDFR 30, engine 28 resolves to the table and determines whether it exists, is bogus, or is damaged. In particular, the QADBRSDFR 30 is verified for bogosity to prevent security exposure, whereby a user may delete the QADBRSDFR 30 and create one with the same name, possibly enabling a "Trojan horse" security issue.

If QADBRSDFR 30 is non-existent, bogus, or damaged engine 28 will specify an error at step 124 and terminate the explicit restoration at step 126. Engine 28 may also make an entry in a joblog or outfile to notify a user of the failure of the explicit restoration at step 124.

Returning to step 122, if QADBRSDFR 30 is verified, engine 28 resolves to the first deferral record with a matching DFRID to that of the DFRID specified in the explicit restoration request at step 128. At step 130, engine 28 determines whether the end of the QADBRSDFR 30 was reached while searching for the first deferral record with the matching DFRID. If the end of the deferral records was reached, engine 28 terminates the explicit restoration at step 126.

When a deferral record with a matching DFRID to that of the DFRID specified in the explicit restoration request is found, engine 28 determines whether the deferral record is incomplete at step 131. When the record is complete, engine 28 will proceed to determine whether the cached object specified by the deferral record is a deferred MQT at step 132. When the record is incomplete, engine 28 will delete any incomplete records at step 133. An incomplete deferral record may include a DFRID and the classification of the cached object, but then fail to specify the name or dependencies of the cached object. An incomplete deferral record may also include a DFRID and the classification of the cached object, but specify a cached object that is invalid or does not exist.

Referring back to step 132, engine 28 determines from the deferral record whether the cached object is a deferred MQT at step 132. When the cached object is a deferred MQT, engine 28 resolves to the deferred MQT and verifies it at step 134. Engine 28 verifies the deferred MQT by referencing the deferred MQT FDT to determine if the deferred MQT is a physical object, has the classification of MQT, and is in a deferred state. When the deferred MQT is verified, engine 28 determines whether all based-on objects of the deferred MQT have been restored to the target machine at step 136. When all based-on objects of the deferred MQT are present, engine 28 will complete the MQT restoration at step 138 by resetting the flag in the deferred MQT's FDT to indicate that deferred MQT is no longer deferred, creating a query access plan for the MQT, storing pointers to the based-on files in the MQT's FDT, and adding the MQT to all directories of its based-on files. At step 140, engine 28 deletes the record in QADBRSDFR 30 corresponding to the restored MQT. Engine 28 reads the next deferral record to find a matching DFRID to that of the DFRID specified for the explicit restoration at step 142.

Referring back to step 132, if the cached object is not a deferred MQT it will be determined to be a cached logical object. When the cached object is a cached logical object, engine 28 resolves to the cached logical object and determines whether all based-on objects of the cached logical object have been restored at step 146. At step 148 the file structures of the cached logical object are created on the target machine. Also at step 148, the cached logical object is loaded onto the target machine with the cached logical object FDT, a query access plan for the newly restored SQL view is created, and pointers to the based-on objects are stored in the newly restored logical object FDT. At step 150 engine 28 deletes the deferral record in QADBRSDFR 30 corresponding to the restored logical object. Engine 28 reads the next deferral record to find a matching DFRID to that of the DFRID specified in the explicit restoration request at step 142.

If the cached object cannot be verified at step 134, or one or more based-on objects of the cached object are found to be absent in step 136 or step 146, engine 28 determines if the deferral record requires an update at step 156. If so, engine 28 updates the deferral record in QADBRSDFR 30 at step 158.

After completing steps 133, 140, 150, or 158, or determining no record requires an update in step 156, engine 28 reads the next deferral record with the specified DFRID to determine if more recursion is required in the explicit restoration at step 142. Engine then returns to step 130 and determines if there are more deferral records in QADBRSDFR 30.

Accessing a Deferred Object

Embodiments of the invention create a deferred object on the target machine that can be viewed or accessed. However, access to the deferred object may be limited to prevent access to a deferred object's based-on objects. In this way, if a deferred object has unresolved dependencies (i.e., one or more based-on objects of the deferred object is still absent) there are restricted operations available for the deferred object. In particular, a deferred MQT may be created on the target machine and viewed or accessed, while a request to access based-on objects of the deferred MQT will be denied. For example, an attempt to write or change data on the deferred object will be allowed, as will a query as to the size, name, or characteristics of the deferred object. However, some examples of operations that access the based-on objects of a deferred object that may be restricted include SQL ALTER TABLE and REFRESH TABLE statements.

Figure 5:
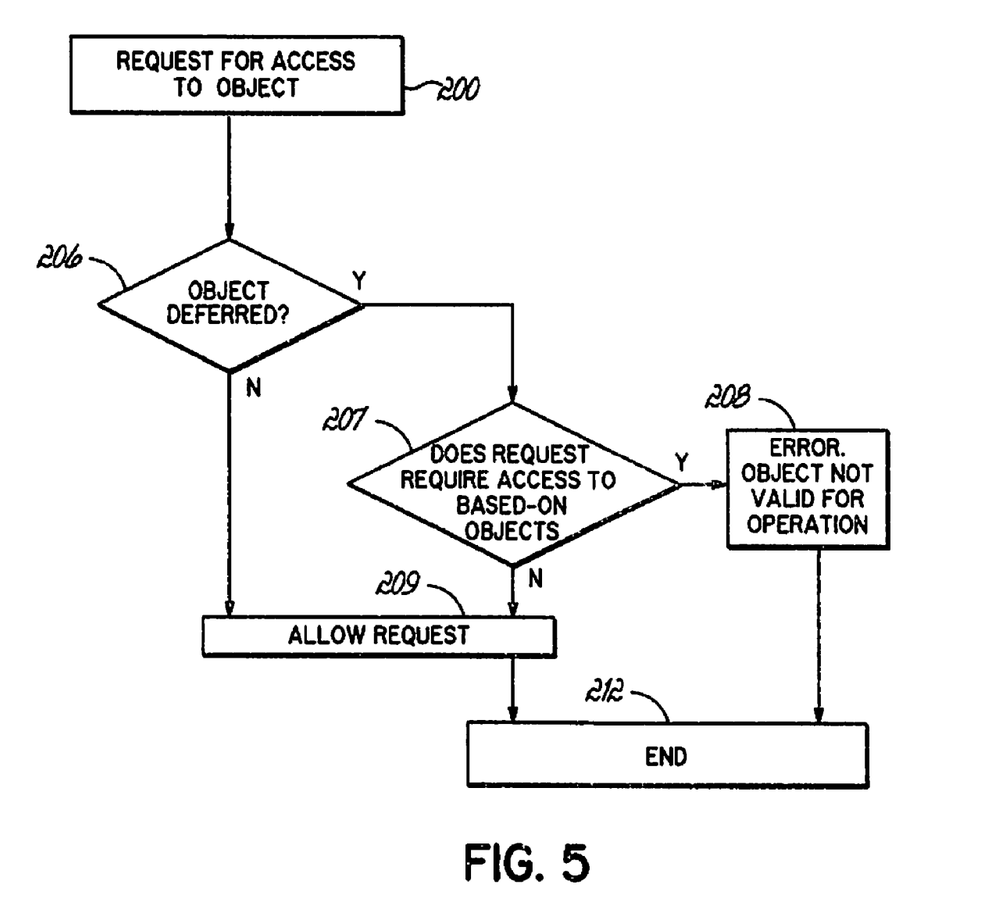
FIG. 5 is a flowchart illustrating an exemplary routine for determining whether access is allowed for a deferred object during or after system restoration in the computing device referenced in FIG. 1.

FIG. 5 is a flowchart illustrating a process of determining whether access is allowed for a deferred object consistent with an embodiment of the invention. At step 200, there is request for an operation on a deferred object. The request may come during or after a restoration of data consistent with embodiments of the invention. The request may come from the target machine, computer 10, engine 28, or networked devices. The request may be processed by the computer 10, a file manager (not shown), or a database manager (not shown).

At step 206, the state of the deferred object is determined. The state is determined by referencing the deferred object's FDT for the state of the object. When the deferred object is still deferred, the request is analyzed to determine whether it requires access to one or more based-on objects of the deferred object at step 207. When the request is attempting to access one or more based-on objects of the deferred object, an error is declared at step 208 indicating that the object is not valid for the operation. Returning to step 207, when the request is not attempting to access one or more based-on objects of the deferred object, the request is allowed and the access to the deferred object is granted at step 209.

Referring back to step 206, when the deferred object is no longer in a deferred state the request is allowed and the access to the deferred object is granted at step 209. The process for determining whether access is allowed for a deferred object may end at step 212.

While the present invention has been illustrated by a description of the various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A method of restoring data in a computer, the method comprising:
   in response to an attempt to restore a data object in the computer, identifying at least one unresolved dependency that must be resolved for the data object to be restored, the at least one unresolved dependency being associated with at least one based-on data object that must be restored prior to restoration of the data object to be restored;
   in response to identifying the unresolved dependency, deferring restoration of the data object to be restored and caching data associated with the data object to be restored;
   allowing access to the data object to be restored to a first operation that does not require access to the at least one based-on data object;
   prohibiting access to the data object to be restored to a second operation that requires access to the at least one based-on data object; and
   after the dependency is resolved, completing restoration of the data object to be restored;
   wherein caching data associated with the data object to be restored further comprises:
      storing information about the data object to be restored in a deferred operation data structure, wherein the deferred operation data structure is resident in a memory of the computer;
      caching the data object to be restored in the deferred operation data structure; and
      restoring the data object to be restored, wherein restoring the data object includes setting the data object to be restored to a deferred state.

2. The method of claim 1, further comprising:
resolving the dependency prior to completing restoration of the data object to be restored.

3. The method of claim 2, wherein resolving the dependency further comprises:
restoring the based-on data object associated with the unresolved dependency.

4. The method of claim 1, wherein the deferred operation data structure comprises a deferred operation table.

5. The method of claim 4, wherein completing restoration of the data object to be restored further comprises:
deleting at least one record of the deferred operation table that contains the information about the data object to be restored.

6. The method of claim 5, wherein completing restoration of the data object to be restored further comprises:
deleting the deferred operation table once every data object to be restored has been restored.

7. The method of claim 1, wherein completing restoration of the data object to be restored further comprises:
restoring each based-on data object for which the data object to be restored is dependent; and
restoring the data object to be restored after all based-on data objects have been restored.

8. The method of claim 1, wherein completing restoration of the data object to be restored further comprises:
creating each based-on data object for which the data object to be restored is dependent; and
restoring the data object to be restored after all based-on data objects have been created.

9. The method of claim 1, further comprising:
displaying a user interface to manage and track the restoration of the data object to be restored, wherein the user interface is operable to receive commands from a user.

10. A method of restoring data in a computer, the method comprising:
in response to an attempt to restore a data object in the computer, identifying at least one unresolved dependency that must be resolved for the data object to be restored, the at least one unresolved dependency being associated with at least one based-on data object that must be restored prior to restoration of the data object to be restored;
in response to identifying the unresolved dependency, deferring restoration of the data object, wherein deferring restoration of the data object comprises:
storing information about the data object in a deferred operation table, wherein the deferred operation table is resident in a memory of the computer; and
setting the data object to a deferred state;
allowing access to the data object, while the data object is in the deferred state, to a first operation that does not require access to the at least one based-on data object;
prohibiting access to the data object, while the data object is in the deferred state, to a second operation that requires access to the at least one based-on data object; and
after the dependency is resolved, completing restoration of the data object, wherein completing restoration of the data object comprises:
deleting information stored about the data object from the deferred operation table; and
setting the data object to a state in which the data object is no longer deferred.

11. An apparatus, comprising:
at least one processor; and
a memory containing program code, the program code configured to be executed by the at least one processor to restore data in a computer by identifying at least one unresolved dependency that must be resolved for a data object to be restored in response to an attempt to restore the data object, wherein the at least one unresolved dependency is associated with at least one based-on data object that must be restored prior to restoration of the data object to be restored, deferring restoration of the data object to be restored and caching data associated with the data object to be restored in response to identifying the unresolved dependency, allowing access to the data object to be restored to a first operation that does not require access to the at least one based-on data object, prohibiting access to the data object to be restored to a second operation that requires access to the at least one based-on data object, and completing restoration of the data object to be restored after the dependency is resolved, wherein the program code is configured to cache data associated with the data object to be restored further by storing information about the data object to be restored in a deferred operation data structure, wherein the deferred operation data structure is resident in a memory of the computer, caching the data object to be restored in the deferred operation data structure, and restoring the data object to be restored, wherein the program code is configured to restore the data object by setting the data object to be restored to a deferred state.

12. The apparatus of claim 11, wherein the program code is further configured to resolve the dependency prior to completing restoration of the data object to be restored.

13. The apparatus of claim 12, wherein the program code is further configured to resolve the dependency by restoring the based-on data object associated with the unresolved dependency.

14. The apparatus of claim 11, wherein the deferred operation data structure comprises a deferred operation table.

15. The apparatus of claim 14, wherein the program code is further configured to delete at least one record of the deferred operation table that contains the information about the data object to be restored.

16. The apparatus of claim 15, wherein the program code is further configured to delete the deferred operation table once every data object to be restored has been restored.

17. The apparatus of claim 11, wherein the program code is further configured to display a user interface to manage and track the restoration of the data object to be restored.

18. A program product, comprising:
program code configured to be executed by at least one processor to restore data in a computer by identifying at least one unresolved dependency that must be resolved for a data object to be restored in response to an attempt to restore the data object to be restored, wherein the unresolved dependency is associated with a based-on data object that must be restored prior to restoration of the data object to be restored, deferring restoration of the data object to be restored and caching data associated with the data object to be restored in response to identifying the unresolved dependency, allowing access to the data object to be restored to a first operation that does not require access to the at least one based-on data object, prohibiting access to the data object to be restored to a second operation that requires access to the at least one based-on data object, and completing restoration of the data object to be restored after the based-on data object associated with the identified unresolved dependency has been restored, wherein the program code is configured to cache data associated with the data object to be restored further by storing information about the data object to be restored in a deferred operation data structure, wherein the deferred operation data structure is resident in a memory of the computer, caching the data object to be restored in the deferred operation data structure, and restoring the data object to be restored, wherein the program code is configured to restore the data object by setting the data object to be restored to a deferred state; and a recordable medium bearing the program code.

\* \* \* \* \*